(12) United States Patent
Van Phan et al.

(10) Patent No.: US 12,550,019 B2
(45) Date of Patent: Feb. 10, 2026

(54) EFFICIENT SUPPORT FOR USER EQUIPMENT WITH REDUNDANT PROTOCOL DATA UNIT SESSION

(71) Applicant: Nokia Technologies Oy, Espoo (FI)

(72) Inventors: Vinh Van Phan, Oulu (FI); Zexian Li, Espoo (FI); Ling Yu, Kauniainen (FI); Devaki Chandramouli, Plano, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 442 days.

(21) Appl. No.: 18/042,918

(22) PCT Filed: Jul. 12, 2021

(86) PCT No.: PCT/EP2021/069330
§ 371 (c)(1),
(2) Date: Feb. 24, 2023

(87) PCT Pub. No.: WO2022/042927
PCT Pub. Date: Mar. 3, 2022

(65) Prior Publication Data
US 2023/0362761 A1   Nov. 9, 2023

Related U.S. Application Data

(60) Provisional application No. 63/070,585, filed on Aug. 26, 2020.

(51) Int. Cl.
*H04W 36/00* (2009.01)
*H04W 76/16* (2018.01)

(52) U.S. Cl.
CPC ....... *H04W 36/0085* (2018.08); *H04W 76/16* (2018.02); *H04W 36/00698* (2023.05)

(58) Field of Classification Search
None
See application file for complete search history.

(56) References Cited

U.S. PATENT DOCUMENTS

2019/0075495 A1*  3/2019  Liu .................... H04W 88/06
2022/0232413 A1*  7/2022  Ma .................... H04W 28/0273

FOREIGN PATENT DOCUMENTS

| EP | 3310120 A1 | 4/2018 |
| EP | 3618498 A1 | 3/2020 |
| WO | 2019/162904 A1 | 8/2019 |

OTHER PUBLICATIONS

"3rd Generation Partnership Project; Technical Specification Group Services and System Aspects; System architecture for the 5G System (5GS); Stage 2 (Release 16)", 3GPP TS 23.501, V16.4.0, Mar. 2020, pp. 1-430.

(Continued)

*Primary Examiner* — Kouroush Mohebbi
(74) *Attorney, Agent, or Firm* — Carter, DeLuca & Farrell LLP

(57) ABSTRACT

A method may include establishing a second communication session at a second network with a user equipment that currently has a first communication session with a first network. The method may also include receiving a report from the user equipment including information related to measurement and reporting of the user equipment on the first network. The method may further include, based on the report, performing an adaptation of an operation and performance of the second communication session for the user equipment.

1 Claim, 10 Drawing Sheets

(56) References Cited

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.
"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.
"New WID: System enhancement for Redundant PDU Session", 3GPP TSG SA2 Meeting #138E, S2-2003256, Agenda: 9.1, Nokia, Apr. 20-23, 2020, 3 pages.
"3rd Generation Partnership Project; Technical Specification Group Services and System Aspects; Study on enhancement of Ultra-Reliable Low-Latency Communication (URLLC) support in the 5G Core network (5GC) (Release 16)", 3GPP TR 23.725, V16.2.0, Jun. 2019, pp. 1-93.
"Summary of URLLC Draft Session and Way Forward", SA2 136#, S2-1912317, Huawei, Nov. 20, 2019, 3 pages.
"Clarifications to dual connectivity based redundancy", SA WG2 Meeting #S2-136, S2-1911099, Ericsson, Nov. 18-22, 2019, 4 pages.
"Updates for PDU Session pair information", SA WG2 Meeting #S2-136, S2-1911100, Ericsson, Nov. 18-22, 2019, 25 pages.
"5G URLLC Handling redundant PDU Sessions", SA WG2 Meeting #136, S2-1910965, Nokia, Nov. 18-22, 2019, pp. 1-5.
"Clarification on PDU session pair information to NG-RAN", 3GPP TSG-SA2 Meeting #136, S2-1911234, LG Electronics, Nov. 18-22, 2019, 4 pages.
"Clarification on PDU session pair information to NG-RAN", 3GPP TSG-SA2 Meeting #136, S2-1911235, LG Electronics, Nov. 18-22, 2019, 5 pages.
"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340, V16.1.0, Mar. 2020, pp. 1-74.
"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.0.0, Mar. 2020, pp. 1-1048.
International Search Report and Written Opinion received for corresponding Patent Cooperation Treaty Application No. PCT/EP2021/069330, dated Nov. 10, 2021, 14 pages.
"Discussion on Higher Layer Multi-Connectivity Solution#1", 3GPP TSG-RAN WG3 #104, R3-192388, Agenda: 17.2.4, CATT, May 13-17, 2019, 4 pages.

* cited by examiner

EFFICIENT SUPPORT FOR USER EQUIPMENT WITH REDUNDANT PROTOCOL DATA UNIT SESSION

RELATED APPLICATION

This application was originally filed as PCT Application No. PCT/EP2021/069330, filed on Jul. 12, 2021, which claims priority from U.S. Provisional Application No. 63/070,585, filed on Aug. 26, 2020, each of which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for efficient support for user equipment with redundant protocol data unit session.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bit rates on the order of 10-20 Gbit/s or higher, and will support at least enhanced mobile broadband (eMBB) and ultra-reliable low-latency communications (URLLC) as well as massive machine type communications (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

BRIEF DESCRIPTION OF THE DRAWINGS

For proper understanding of example embodiments, reference should be made to the accompanying drawings, wherein:

FIG. 10(*b*) illustrates another apparatus, according to certain example embodiments.

DETAILED DESCRIPTION

Figure 1:
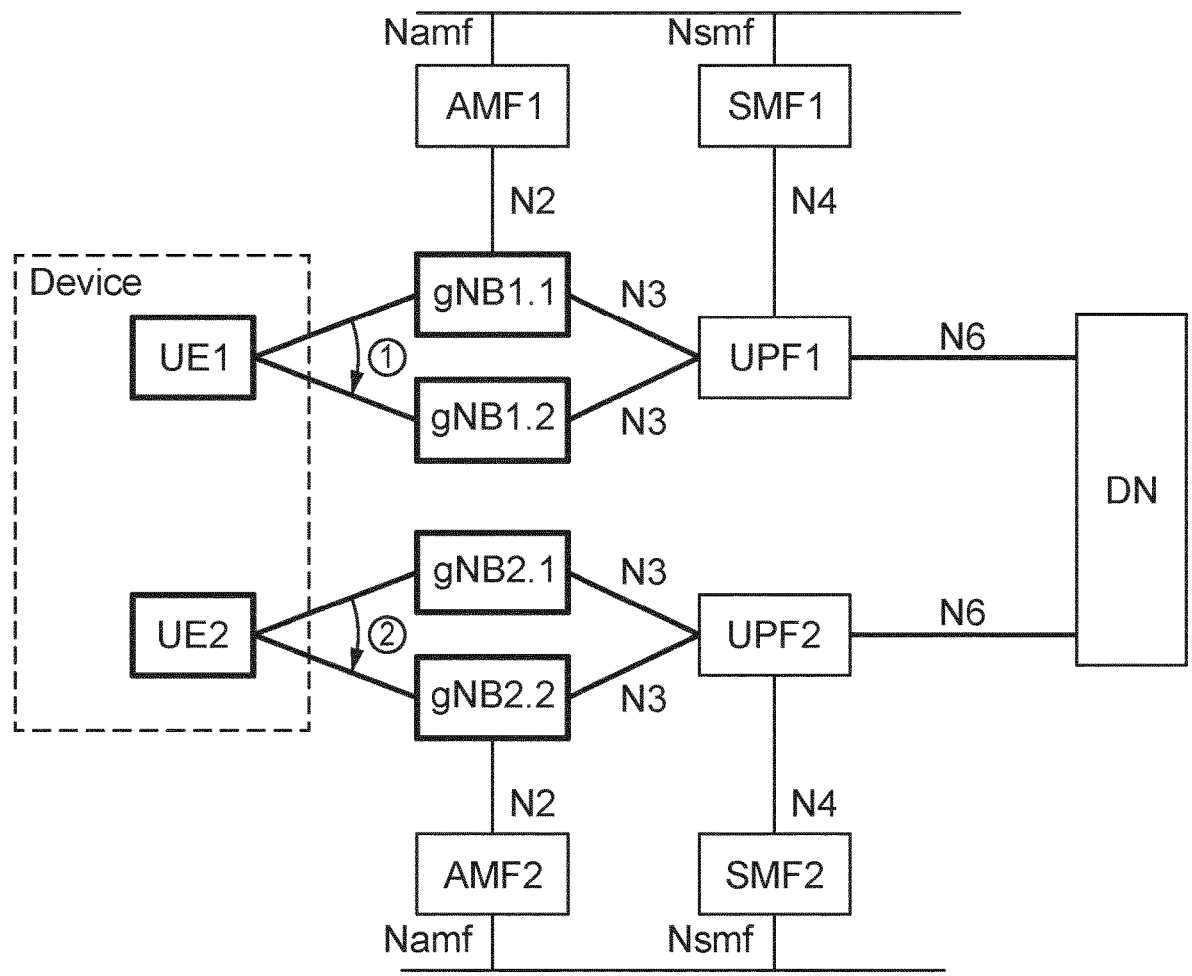
FIG. 1 illustrates an example of a reliability group-based redundancy concept in a mobile cellular network such as 5G.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for efficient support for user equipment (UE) with redundant protocol data unit (PDU) session.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as merely illustrative of the principles and teachings of certain example embodiments, and not in limitation thereof.

3rd Generation Partnership Project (3GPP) describes system enhancements for redundant PDU session (SE-RPS). For instance, 3GPP describes higher-layer multi-connectivity schemes for supporting industrial Internet of Things (IIoT) and ultra-reliable low-latency communication (URLLC), including redundant PDU session (RPS). In the RPS scheme, the UE (single or dual device) may be provided with at least two PDU sessions for serving the same applications or service flow(s). In addition, the PDU sessions may be set up and provided using independent network resources (for example serving network nodes) across the radio access network (RAN), transport network layer (TNL)

and/or core network (CN) domains to avoid the single-point failure issue on at least one targeted domain, as ultra-high reliability is required.

As described in 3GPP, the UE may provide a serving session management function (SMF(s)) with the RPS pair information. The SMF(s) may then provide this information to the serving RAN(s). Further, the serving RAN(s) may use the information for at least selection or reselection of proper RAN node(s). Doing so may provide for the paired PDU sessions of the UE in the way that the paired PDU sessions may be independently established without any constraints on the selected SMF(s). As described herein, the serving nodes across the RAN, TNL, and/or CN domains of a first PDU session (PS1) may be referred to as the first network (NW1), which may include the first NG-RAN nodes (gNB1), and the first CN node (CN1). Further, the serving nodes of the second PDU session (PS2) may be referred to as the second network (NW2), which may include the second NG-RAN nodes (gNB2) and the second CN node (CN2). In addition, the UE host may include one or more UE device(s).

To efficiently support the UE with RPS, there may be a need for coordination and adaptation between NW1 and NW2 on QoS control and data transmission for the paired PDU sessions. In doing so, it may be possible to ensure that a service interruption or degradation due to, for example, UE mobility or poor channel condition, does not happen on both of the paired PDU sessions simultaneously or reduce the impact. However, the ability to enable and facilitate such coordination and adaptation may be challenging.

FIG. 1 illustrates an example of a reliability group-based redundancy concept in a mobile cellular network such as 5G system. In an effort to address at least some of the above-described issues and challenges, 3GPP describes a timing coordination for handover (HO) in serving the RPS with dual UE devices, UE1 and UE2. This coordination is based on an assignment of disjoint time periods (e.g. in a range of 100 ms) for HO of UE1 and UE2 to ensure that UE1 and UE2 are not in HO simultaneously. As such, service interruption caused by HO may be avoided. Although this may be a possible solution, it is not robust, as HO or radio-link related issues may not just be delayed until a configured preferred time period to be executed or resolved. In addition, such solution may introduce new configurations and procedures for e.g. configuring and executing HO with the time constrains defined by the disjoint time periods, which have a notable impact on standardization.

3GPP further describes measurement and reporting related supporting multi-connectivity (MC). For example, 3GPP describes a secondary node change procedure that can be triggered by both a master node (MN) (for inter-frequency secondary node change) and the secondary node (SN). For SN changes triggered by the SN, the radio resource management (RRM) measurement configuration is maintained by the SN, which also processes the measurement reporting without providing the measurement results to the MN.

In addition, according to 3GPP, measurements may be configured independently by the MN and by the SN (intra-RAT measurements on serving and non-serving frequencies). Further, the MN may indicate the maximum number of frequency layers and measurement identities that can be used in the SN to ensure that UE capabilities are not exceeded. If MN and SN both configure measurements on the same carrier frequency, then the configurations may need to be consistent (if the network desires to ensure these are considered as a single measurement layer).

Furthermore, 3GPP describes that measurement results related to the target SN may be provided by the MN to a target SN at an MN initiated SN change procedure. Measurement results related to the target SN may be forwarded from the source SN to the target SN via MN at an SN initiated SN change procedure. In addition, measurement results related to the target SN may be provided by a source MN to the target MN at an Inter-MN handover with/without SN change procedure. However, the current multi-connectivity (MC) does not consider any enhancement for support of RPS. In addition, during MN change without SN change or SN change without MN change, if the PDCP termination point of radio bearer (RB) is in the node without change, then data transmissions on the RB may be kept going without an interruption, at least for a certain time period.

Figure 2:
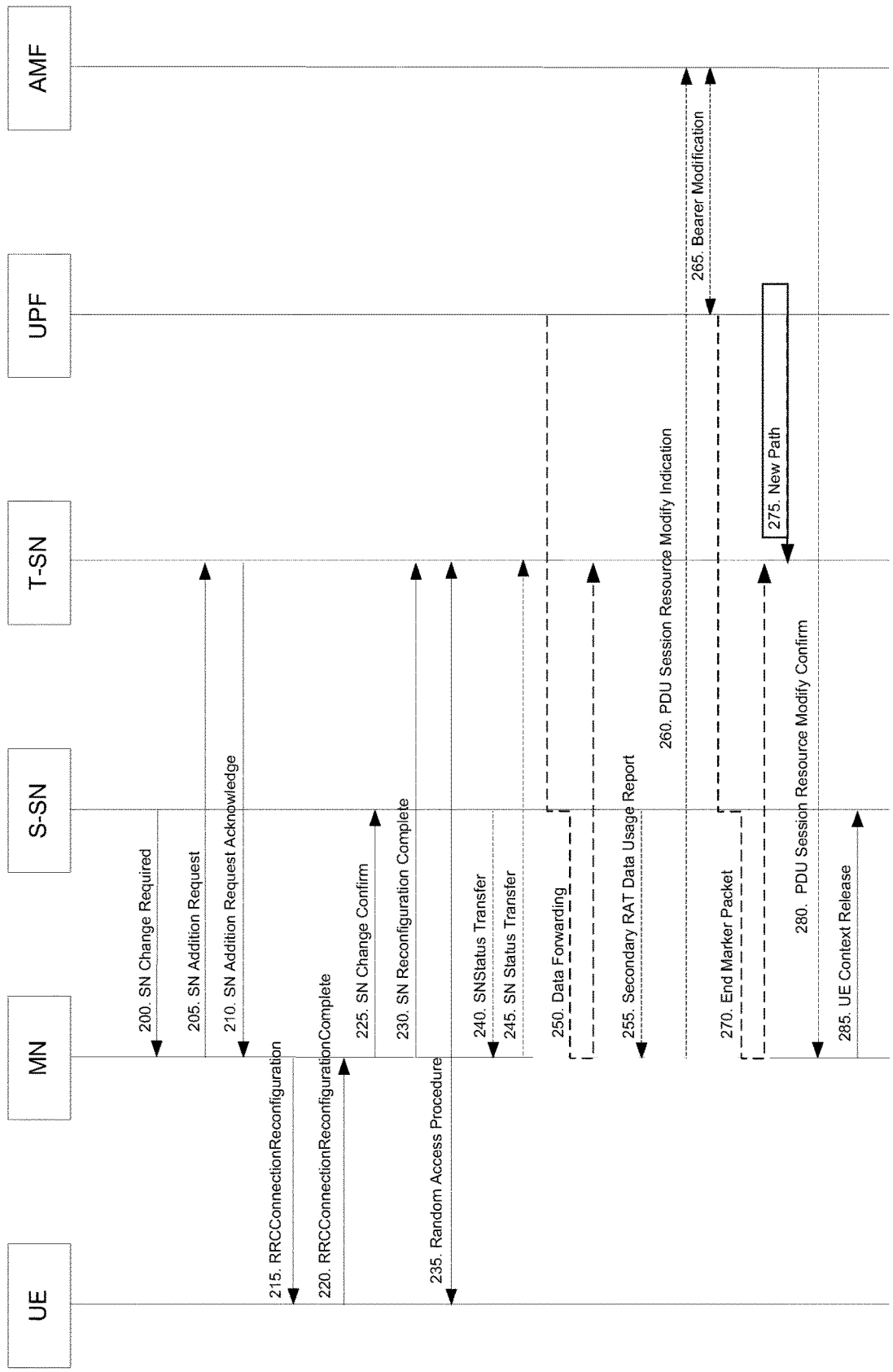
FIG. 2 illustrates an example signal flow of a secondary node change procedure initiated by the secondary node.

FIG. 2 illustrates an example signal flow of an SN change procedure initiated by the SN. At 200, the source SN may initiate the SN change procedure by sending the SN change request message, which may include a candidate target node ID. The SN change request message may also include the secondary cell group (SCG) configuration (to support delta configuration), and measurement results related to the target SN. At 205/210, the MN may request the target SN to allocate resources for the UE by means of the SN addition procedure, including the measurement results related to the target SN received from the source SN. If data forwarding is needed, the target SN may provide data forwarding addresses to the MN. Further, the target SN may include the indication of the full or delta radio resource control (RRC) configuration.

At 215/220, the MN may trigger the UE to apply the new configuration. In particular, the MN may indicate the new configuration to the UE in the MN RRC reconfiguration message including the SN RRC reconfiguration message generated by the target SN. The UE may apply the new configuration, and send the MN RRC reconfiguration complete message, including the SN RRC response message for the target SN, if needed. In case the UE is unable to comply with (part of) the configuration included in the MN RRC reconfiguration message, it may perform the reconfiguration failure procedure.

At 225, if the allocation of the target SN resources was successful, the MN may confirm the change of the source SN. Further, if data forwarding is needed, the MN may provide data forwarding addresses to the source SN. If direct data forwarding is used for SN terminated bearers, the MN may provide data forwarding addresses as received from the target SN to the source SN. Further, receiving the SN change confirm message may trigger the source SN to stop providing user data to the UE and, if applicable, to start data forwarding.

At 230, if the RRC connection procedure was successful, the MN may inform the target SN via SN reconfiguration complete message with the included SN RRC response message for the target SN, if received from the UE. Further, at 235, the UE may synchronize to the target SN with random access procedure. At 240/245, if the packet data convergence protocol (PDCP) termination point is changed for bearers using radio link control (RLC) acknowledgment mode (AM), the source SN may send the SN status transfer, which the MN may then send to the target SN, if needed.

At 250, if applicable, data forwarding from the source SN may take place. In particular, it may be initiated as early as the source SN receives the SN change confirm message from the MN. At 255, the source SN may send the secondary RAT data usage report message to the MN, and may include the data volumes delivered to and received from the UE. Further, at 260-280, if applicable, a PDU session path update procedure may be triggered by the MN. In addition, at 285, upon reception of the UE context release message, the source SN may release radio and C-plane related resources associated to the UE context, and any ongoing data forwarding may continue.

Figure 3:
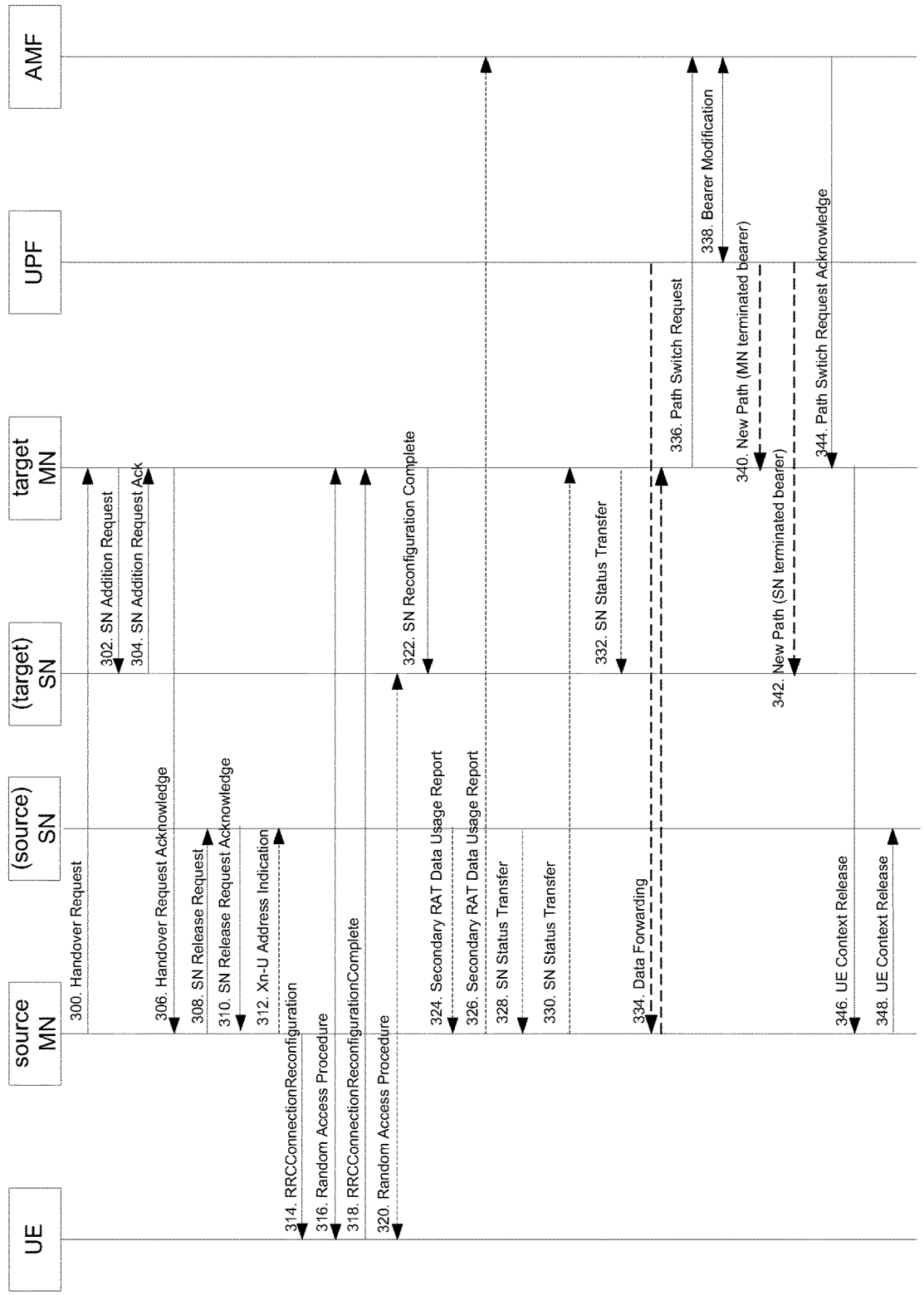
FIG. 3 illustrates an example signal flow of an inter-master node handover with/without master node initiated secondary node change procedure.

FIG. 3 illustrates an example signal flow of an inter-MN handover with/without MN initiated SN change procedure. At 300, the source MN may start the handover procedure by initiating the Xn handover preparation procedure including both master cell group (MCG) and SCG configuration. The source MN may include the source SN UE XnAP ID, SN ID and the UE context in the source SN in the handover request message. Further, at 302, if the target MN decides to keep the source SN, the target MN may send an SN addition request to the SN including the SN UE XnAP ID as a reference to the UE context in the SN that was established by the source MN. If the target MN decides to change the SN, the target MN may send the SN addition request to the target SN including the UE context in the source SN that was established by the source MN.

At 304, the (target) SN may reply with an SN addition request acknowledge message. Further, the (target) SN may include the indication of the full or delta RRC configuration in the reply. At 306, the target MN may include within the handover request acknowledge message, the MN RRC reconfiguration message to be sent to the UE to perform the handover, and may provide forwarding addresses to the source MN. If the PDU session split is performed in the target side during handover procedure, more than one data forwarding addresses corresponding to each node may be included in the handover request acknowledge message. Further, the target MN may indicate to the source MN that the UE context in the SN is kept if the target MN and the SN decided to keep the UE context in the SN in steps 302 and 304.

At 308/310, the source MN may send an SN release request message to the (source) SN including a cause indicating MCG mobility. The (source) SN may acknowledge the release request. The source MN may indicate to the (source) SN that the UE context in SN is kept, if it receives the indication from the target MN. If the indication as the UE context kept in SN is included, the SN may keep the UE context. At 312, the source MN may send an Xn-U address indication message to the (source) SN to transfer data forwarding information. In addition, more than one data forwarding address may be provided if the PDU session is split in the target side.

At 314, the source MN may trigger the UE to perform handover and apply the new configuration. In addition, at 316/318, the UE may synchronize to the target MN and reply with an MN RRC reconfiguration complete message. Further, at 320, if configured with bearers requiring SCG radio resources, the UE may synchronize to the (target) SN. At 322, if the RRC connection reconfiguration procedure was successful, the target MN may inform the (target) SN via an SN reconfiguration complete message. Further, at 324, the source SN may send the secondary RAT data usage report message to the source MN and include the data volumes delivered to and received from the UE over the NR/E-UTRA radio. At 326, the source MN may send the secondary RAT report message to the access and mobility management function (AMF) to provide information on the used NR/E-UTRA resource.

At 328/330/332, for bearers using RLC AM, the source MN may send the SN status transfer to the target MN, including, if needed, SN status received from the source SN. Further, the target may forward the SN status to the target SN, if needed. At 334, if applicable, data forwarding may take place from the source side. If the SN is kept, data forwarding may be omitted for SN terminated bearers or QoS flows kept in the SN. In addition, at 336-344, the target MN may initiate the path switch procedure. In particular, if the target MN includes multiple DL TEIDs for one PDU session in the path switch request message, multiple UL TEID of the user plane function (UPF) for the PDU session may be included in the path switch acknowledgment message in case there is TEID update in the UPF.

At 346, the target MN may initiate the UE context release procedure towards the source MN. Further, at 348, upon reception of the UE context release message from the source MN, the (source) SN may release C-plane related resources associated to the UE context towards the source MN. In addition, any ongoing data forwarding may continue. Further, the SN may not release the UE context associated with the target MN if the UE context kept indication was included in the SN release request message in procedures 308-312.

Certain example embodiments may provide a method that enables and facilitates coordination and adaptation between NW1 and NW2 for serving the UE with RPS. For instance, certain example embodiments may be based on enhancements related to existing UE measurement and reporting, as well as the existing timer procedures (networking events and timers guarding corresponding events), as described in 3GPP. In particular, the UE is configured to indicate or expose to NW2 certain information related to the UE measurement and reporting, as well as timer procedures the UE is currently performing for NW1 and vice versa. The exposed information may be, for example, an identifier of an event type associated with the current measurement and reporting or timer procedure at the UE. The exposed information may also be an identifier of a certain trigger or counter being used for the current measurement and reporting or timer procedure at the UE. In addition, the exposed information may be an identifier of a certain timer being started at the UE. Further, the exposed information may be an entire or partial UE measurement report being sent by the UE to NW1, but without exposing details of network-specific configuration such as the timer constraint or measurement-related control configuration. Further, the UE is configured to inquire NW1 to provide details of network-specific configuration, either related to the previous exposed information specifically, or related to the RPS in general for NW2 upon request from NW2.

As described herein, certain example embodiments may allow for essential information for enabling and facilitating necessary network coordination and adaption between NW1 and NW2 in serving the UE with RPS is made available in a timely, controllable and efficient manner According to certain example embodiments, this procedure does not cause a significant impact on the current standards, and does not require significant extra efforts for standardization and implementation.

Figure 4:
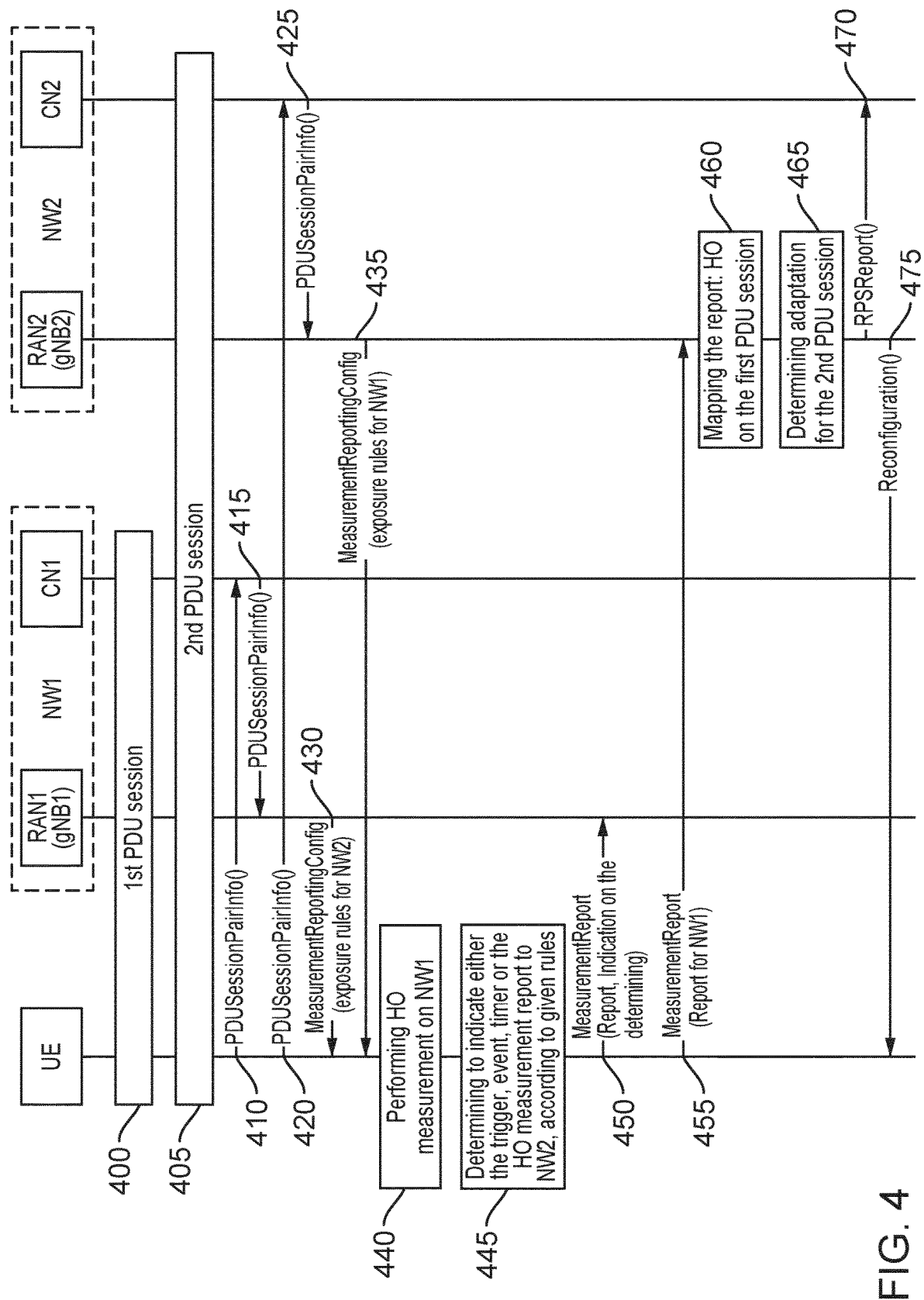
FIG. 4 illustrates an example signal flow of a user equipment informing NW2 of user equipment measurement report for handover in NW1, according to certain example embodiments.

FIG. 4 illustrates an example signal flow of the UE informing NW2 of UE measurement report for HO in NW1, according to certain example embodiments. Certain example embodiments may introduce enablers to coordinate the HO when the URLLC session is duplicated for resiliency purposes. For instance, if the user plane session is duplicated for resiliency purposes in (M)gNB1 and (S)gNB2, and HO is about to occur, both sessions should not handover at the same time to ensure that zero interruption is achieved during HO for the URLLC session.

In FIG. 4, NW2 may determine that the report from the UE indicates that a HO is about to happen to the UE in NW1, which may cause an interruption to the first PDU session (PS1) of RPS. Here, NW2 may prepare and perform necessary action for preventing a simultaneous HO for the UE in NW2, or at least maintaining the second PDU session (PS2) of RPS for the UE while HO is expected for the UE in NW1. In this example of NW2 action, gNB2 may activate multi-connectivity (MC) or add a new SN, or reconfigure the PDCP termination point for RBs of PS2 in NW2 for the UE to reassure that the user plane for PS2 may be maintained for a certain time interval, which is sufficient enough for HO execution in NW1.

As illustrated in FIG. 4, at 400, the UE may establish a first PDU session with NW1 and, at 405, the UE may establish a second redundant PDU session with NW2. At 410, the UE may send a redundant PDU session pair information message to CN1 and, at 415, CN1 may forward the PDU session pair information to gNB1. Further, at 420, the UE may send the PDU session pair information message to CN2, and CN2 may forward the PDU session pair information to gNB2 at 425. The PDU session pair information messages in step 410 and 420 may indicate to NW1 and NW2 respectively the established redundant PDU sessions are for the same user plane session for resiliency purposes. According to certain example embodiments, the detailed information elements in the two messages of 410 and 420 may be the same or different. At 430, gNB1 may send a measurement reporting configuration to the UE, which may include exposure rules for NW2. Further, at 435, gNB2 may send measurement and reporting configuration to the UE, which may include exposure rules for NW1. According to certain example embodiments, the exposure rules may be configured to the UE for exposing information related to the UE measurement and/or reporting as well as timer procedures of one NW (e.g. NW1) to another NW (e.g. NW2). The rules may specify the list of events/triggers/conditions and corresponding UE measurement report types and contents (IEs) the UE may expose to another network (e.g. NW1 or NW2).

FIG. 4 also illustrates, at 440, the UE performing a HO measurement on NW1. In addition, at 445, the UE may determine to indicate the allowed exposure information such as either the triggers, events, timers, or the HO measurement reports of NW1 to NW2, according to the configured exposure rules received at 430. After the determination, at 450, the UE may send a measurement report to gNB1, which may include an indication on the determination. At 455, the UE may also send another measurement report to gNB2 based on the allowed exposure information determined at 445 and related to the measurement report for NW1 at 450. The measurement report at 455 may also include the PDU session pair information to allow gNB2 to map the measurement report of NW1 with relevant PDU session (e.g. PS2) in NW2. At 460, gNB2 may map the received report to the relevant PDU sessions and determine that the report from the UE indicates a HO is about to happen to the UE in NW1, which may cause an interruption to the first PDU session of RPS. At 465, gNB2 may determine an adaptation for the second PDU session (PS2), which may include preparing and performing necessary action for preventing a simultaneous HO for the UE in NW2 or at NW1. As previously noted, the action may include the gNB activating MC or adding a new SN, or reconfiguring the PDCP termination point for RBs of PS2 or adjusting the transmission format/resource in NW2 for the UE to reassure that the user plane for PS2 may be maintained for a certain time interval that is sufficient enough for HO execution in NW1.

Figure 5:
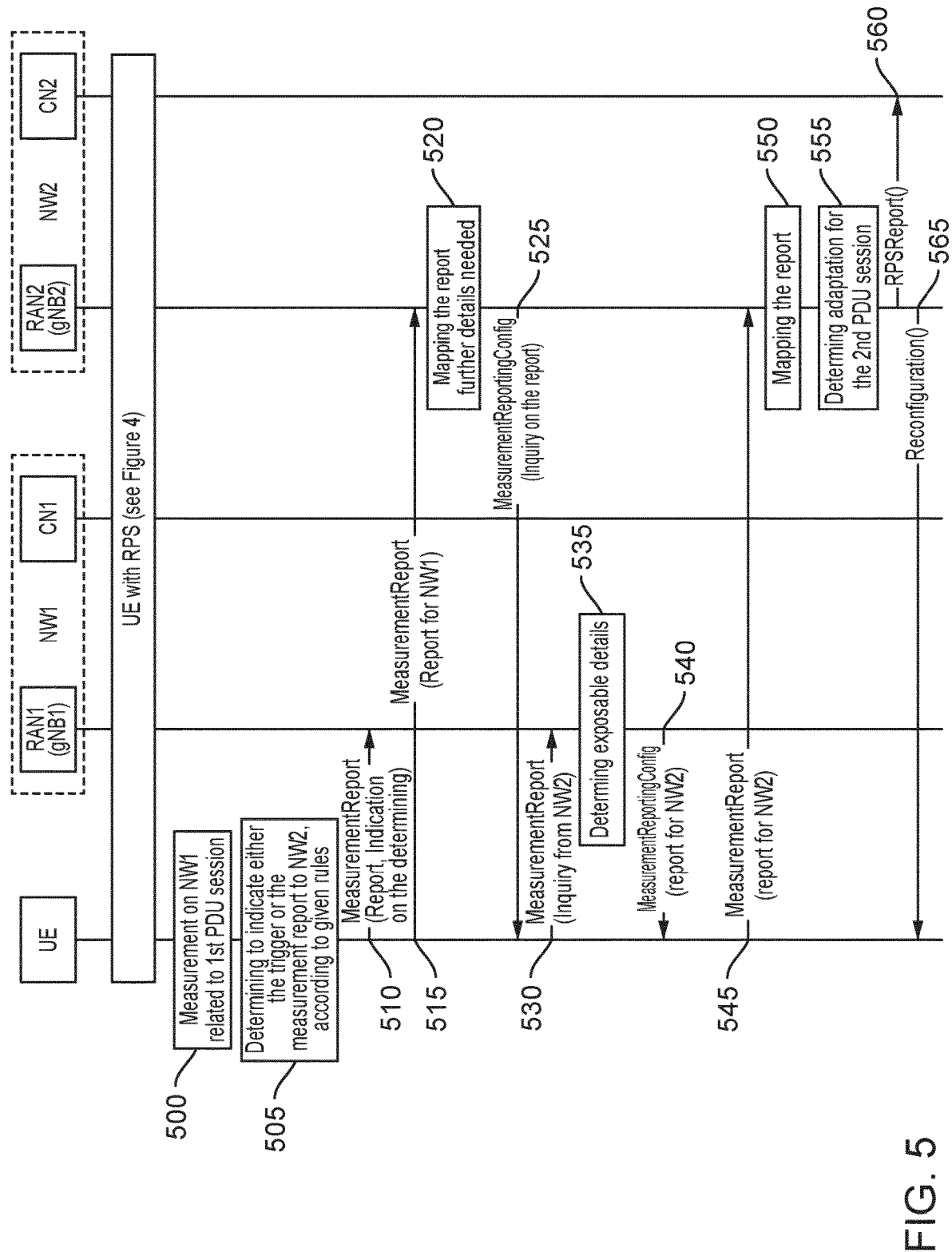
FIG. 5 illustrates an example signal flow of an inquiry from NW2 to NW1 on a report received from the user equipment on NW1, according to certain example embodiments.

FIG. 5 illustrates an example signal flow of an inquiry from NW2 to NW1 on the report received from the UE on NW1, according to certain example embodiments. In particular, FIG. 5 illustrates an example in which NW2 upon receiving the exposed report on NW1, initiates an inquiry for further details on the exposed report via the UE. For example, NW2 upon receiving a report from the UE that a timer T or an event E is started at the UE, may initiate an inquiry in order to determine the set constraint of the timer T or the set trigger, and other parameters of the event E.

As with FIG. 4, the UE may have established RPS with NW1 and NW2. At 500, the UE may perform measurement(s) on NW1 related to the first PDU session (PS1). At 505, the UE may determine to indicate the allowed exposure information such as the triggers or the measurement report to NW2, according to the configured exposure rules received at 430 in FIG. 4. Further, at 510, the UE may send a measurement report to gNB1, which may include a report of the indication on the determination. In addition, at 515, the UE may send another measurement report to gNB2 based on the allowed exposure information determined at 505 and related to the report for NW1 at 510. At 520, gNB2 may map the report, at which point gNB2 may determine that further details are needed (e.g., in order to better estimate the potential interruption of PS1 served by NW1). At 525, gNB2 may send a measurement reporting configuration message or a measurement reporting request message to the UE inquiring on the report and, at 530, the UE may send a measurement report including the inquiry from NW2 to gNB1.

FIG. 5 also illustrates, at 535, gNB1 may determine the exposable details and, at 540, gNB1 may send a measurement reporting configuration message to the UE. The measurement reporting configuration message may include an indication to indicate whether the inquired report from NW2 can be reported to NW2 or not. It is also possible that only selective contents from the measurement report can be shared with NW2. The measurement reporting configuration message may further include the exposure rules on exposing additional measurement reports as NW2 inquired. Alternatively or additionally, the measurement reporting configuration message may include the measurement report that NW1 allows the UE to expose to NW2. At 545, the UE may send the measurement report either allowed by NW1 or received from gNB1 to gNB2. The measurement report may further include the PDU session pair information to allow gNB2 to map the measurement report with the relevant PDU session. Further, at 550, gNB2 may map the report to the relevant PDU session and, at 555, gNB2 may determine an adaptation for the second PDU session based on the report. According to certain example embodiments, 525-545 may be other procedure messages, and are not limited to the measurement reporting configuration and measurement report message described above, although use of "measurement" related messages is used herein.

As previously noted, the adaptation actions may include the gNB activates MC or adds a new SN, or reconfigures the PDCP termination point for RBs of PS2 in NW2 or adjusting transmission format/resource for the UE to minimize possible impact caused by what is happening to PS1 of the UE in NW1 on the overall E2E QoS of the RPS, as determined by NW2 (gNB2) based on the exposed information received from the UE. At 560, gNB2 may send an RPS report to CN2 to inform the determined outcome of PS1 as well as the determined actions from CN2 for PS2 such as QoS reconfiguration and, at 565, gNB2 may send a reconfiguration message to the UE if the determined adaptation actions cause gNB to reconfigure the radio bearer services of PS2.

Figure 6:
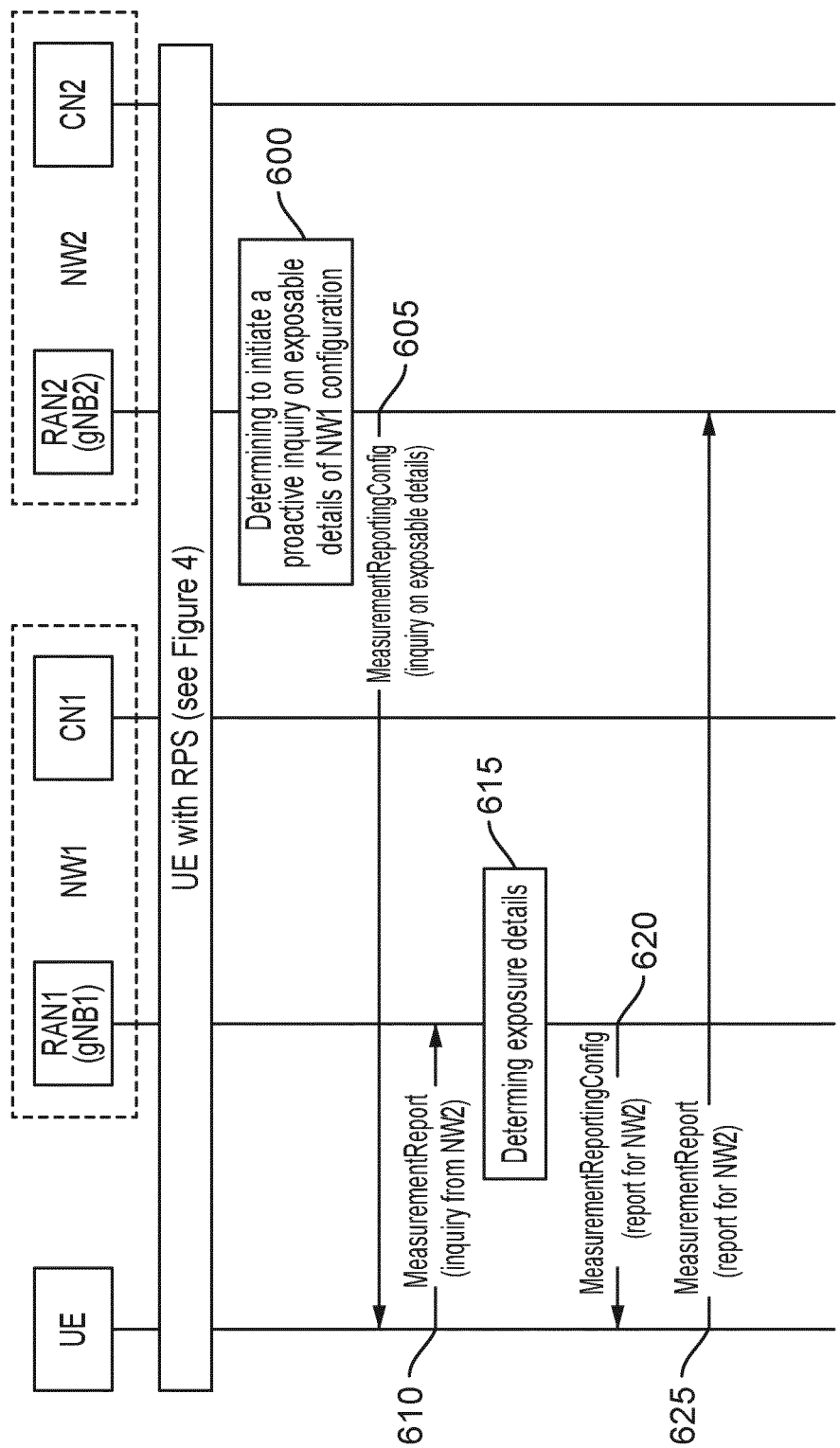
FIG. 6 illustrates an example signal flow of NW2 initiating a proactive inquiry for exposable details of the user equipment measurement report in NW1, according to certain example embodiments.

FIG. 6 illustrates an example signal flow of NW2 initiating a proactive inquiry for exposable details of NW1 configuration for the UE, according to certain example embodiments. In particular, FIG. 6 illustrates an example in which NW2 upon receiving the PDU session pair information from the UE, proactively initiates an inquiry for exposable details on the UE measurement and reporting, as well as timing procedures.

As with FIG. 4, the UE may have RPS with NW1 and NW2. At 600, gNB2 may determine to initiate a proactive inquiry on exposable details of the NW1 configuration. Further, at 605, gNB2 may send a measurement reporting configuration inquiry on the exposable details to the UE. At 610, the UE may send a measurement report including the inquiry from NW2 to gNB1. At 615, gNB1 may determine the exposable details and, at 620, gNB1 may send a measurement reporting configuration message to the UE. The measurement reporting configuration message may include an indication to indicate whether the inquired exposable details from NW2 can be reported to NW2 or not. The measurement reporting configuration message may also include the exposure rules on exposing additional measurement reports as NW2 inquired. Alternatively or additionally, the measurement reporting configuration message may include the measurement report that NW1 allows the UE to expose to NW2. At 625, the UE may send the measurement report either allowed by NW1 or received from gNB1 to gNB2.

According to certain example embodiments, the UE with RPS may be configured by NW1 with rules for exposing information related to the UE measurement and reporting, as well as timer procedures to NW2. In certain example embodiments, the rules may specify the list of events/triggers/conditions and corresponding UE measurement report types and contents (IEs) the UE may expose to NW2. In addition, according to certain example embodiments, the UE with RPS may be configured to indicate to NW1 that the UE is exposing certain information related to the current ongoing UE measurement report or timer procedure to NW2.

In certain example embodiments, the UE with RPS may be configured to receive from NW2, an inquiry either for further details on the exposed report for NW1 received from the UE, or for exposable details on the configuration of NW1 for the UE measurement and reporting, as well as timing procedures of the UE. In some example embodiments, the inquiry may include an indication of the RPS pair information.

As illustrated in FIGS. 4-6, according to certain example embodiments, the UE may forward the received inquiry of NW2 to NW1, and NW1 may determine exposable configuration details for the received inquiry of NW2 and provide that to the UE. In other example embodiments, the UE with RPS may be configured to send to NW2 the exposed configuration of NW1 in response to the inquiry from NW2. In certain example embodiments, the response may include an indication of the RPS pair information.

According to certain example embodiments, the serving gNB2 of NW2, upon receiving an exposed UE measurement report and/or exposed configuration details from the UE with RPS on NW1, may perform certain actions to adapt the operation and performance of PS2 in NW2 for the UE with RPS. This may be done to minimize or avoid possible impact caused by what is happening to PS1 of the UE in NW1 on the overall E2E QoS of the RPS, as determined by gNB2 based on the exposed information received from the UE. In addition, the actions may cause gNB2 to reconfigure the radio bearer services of PS2 and/or to report to CN2 on PS1 about the determined outcome on PS1 (RPSReport illustrated in FIGS. 4 and 5). In some example embodiments the latter may trigger necessary actions from CN2 for PS2 as well, such as QoS reconfiguration or selecting alternative QoS profile.

In certain example embodiments, the indication of PDU session pair information from the CN2 (SMF) to gNB2 may trigger to send the inquiry as illustrated in FIG. 6. In other example embodiments, in case the UE is served using dual connectivity (DC) in NW1, the UE may be configured with DC related rules so that the UE may determine whether a MN change or a SN change in NW1 is causing service interruption to PS1 or not, and therefore whether the related UE measurement and reporting needs to be exposed to NW2 or not. For instance, in certain example embodiments, a SN change without MN change and PDCP termination point(s) of RB(s) for PS1 may be in MN, and there may be no need for the UE to expose SN change related measurement report(s) to NW2.

According to certain example embodiments, signaling exchanges between the UE, NW1, and NW2 as illustrated in FIGS. 4-6, may be implemented using the current RRC UE measurement and reporting procedures (enhanced with new IEs to incorporate certain example embodiments) or a new set of signalling. In addition, the indication of PDU session pair information may be included in the signaling messages as one of the new IEs.

In certain example embodiments where both PS1 and PS2 of the UE are provided using MC with MN and SN, gNB1 of NW1 and gNB2 of NW2 (illustrated in FIG. 4 for instance) may be either MN or SN belonging to the same radio access network. In this example, PDCP termination point(s) of RB(s) for PS1 and PS2 may be distributed between MN and SN so that change of either MN or SN (but not both at the same time) may impact one of PS1 and PS2 (but not both at the same time). For example, the termination point(s) of RB(s) for PS1 may be in MN, whereas the termination point(s) of RB(s) for PS2 may be in SN. According to other example embodiments, the UE may inform either MN or SN of HO measurement reports for either SN or MN to avoid HO of both MN and SN being triggered by MN and SN at the same time. In addition, the MN may add a third SN before initiating a MN change or HO, if needed.

Certain example embodiments may be extended to cover possible non-access stratum (NAS) level measurement and reporting as part of the QoS monitoring of the UE on the paired PDU sessions. In addition, according to other example embodiments, the UE host may include, for example, UE1 and UE2, of which the paired PDU sessions are established, the in-device exchange of the exposed or exposable information between UE1 and UE2 may be used. Further, in certain example embodiments, having the UE with RPS send to NW2 (serving PS2 of the UE) the HO measurement report for NW1 (serving PS1 of the UE) or vice versa may develop into a session initiation protocol (SIP). In this case, the UE may be configured to determine to send to NW2 the HO measurement for NW1 only if the reported cell(s) that is/are included in the HO measurement report for NW1 is/are different from cells configured by NW2 to the UE as the neighboring-cell candidate cell. This may make it possible to avoid confusion or false alarm to NW2. It may then be up to NW2 to determine how to use such report, as NW2 knows the UE is with RPS.

Figure 7:
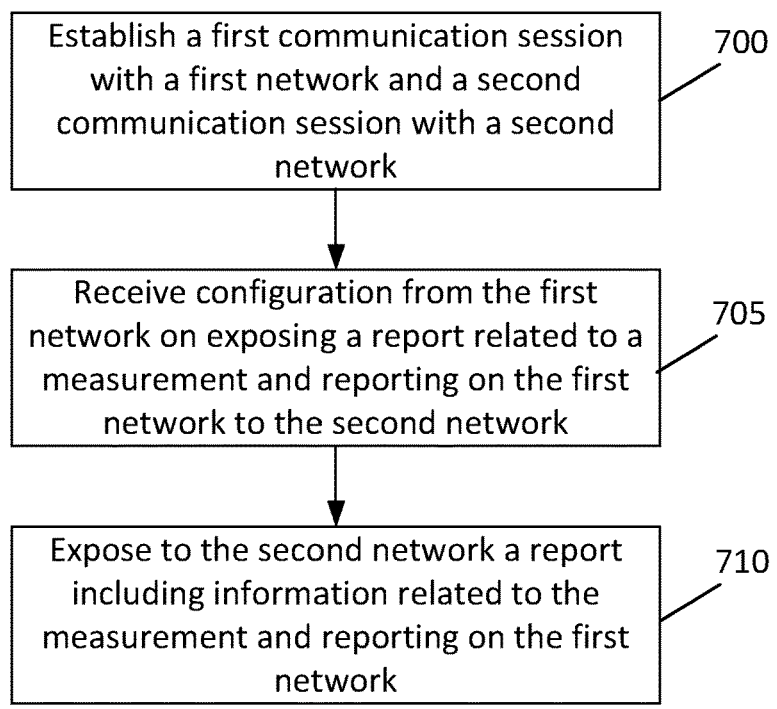
FIG. 7 illustrates a flow diagram of a method, according to certain example embodiments.

FIG. 7 illustrates a flow diagram of a method, according to certain example embodiments. In certain example embodiments, the flow diagram of FIG. 7 may be performed by a telecommunications network, network entity or network node in a 3GPP system, such as LTE or 5G-NR. For instance, in an example embodiment, the method of FIG. 7 may be performed by a UE, for instance similar to apparatuses 10 or 20 illustrated in FIGS. 10(*a*) and 10(*b*).

According to certain example embodiments, the method of FIG. 7 may include, at 700, establishing a first communication session with a first network and a second communication session with a second network. The method may also include, at 705, receiving configuration from the first network on exposing a report related to a measurement and reporting on the first network to the second network. The method may further include, at 710, exposing to the second network a report including information related to the measurement and reporting on the first network.

According to certain example embodiments, the method may also include receiving an inquiry from the second network for exposing the report related to the measurement and reporting on the first network, and forwarding the inquiry to the first network to obtain exposable configuration details of the first network. According to other example embodiments, the receiving configuration on exposing the report may be related to the inquiry from the second network for exposing the report related to the measurement and reporting on the first network. According to further example embodiments, the report related to the measurement and reporting on the first network may include information related to the measurement and reporting on the first network and inquired by the second network.

In certain example embodiments, the configuration from the first network may include an exposure rule, and the method may also include indicating, according to the exposure rule, to the first network that a user equipment is exposing the information related to the measurement and reporting to the second network. In other example embodiments, the information related to the measurement and reporting on the first network may relate to information on at least one of a trigger, timing procedure, or event of measurement at the first network. In some example embodiments, the exposure rule may specify at least one of events, triggers, conditions, measurement report types, contents of the measurement report exposable to the second network, and dual connectivity related rules.

According to certain example embodiments, when the exposure rule specifies dual connectivity related rules, the method may further include determining whether a master node change or a secondary node change in the first network is causing service interruption to the first communication session, and determining whether the measurement and reporting on the first network needs to be exposed to the second network. According to other example embodiments, the inquiry or the report may include an indication of redundant protocol data unit session pair information. According to further example embodiments, the first communication session and the second communication session may be provided using multi-connectivity, and a first network node of the first network, and a second network node of the second network may be represented as a master and secondary node of a same network.

Figure 8:
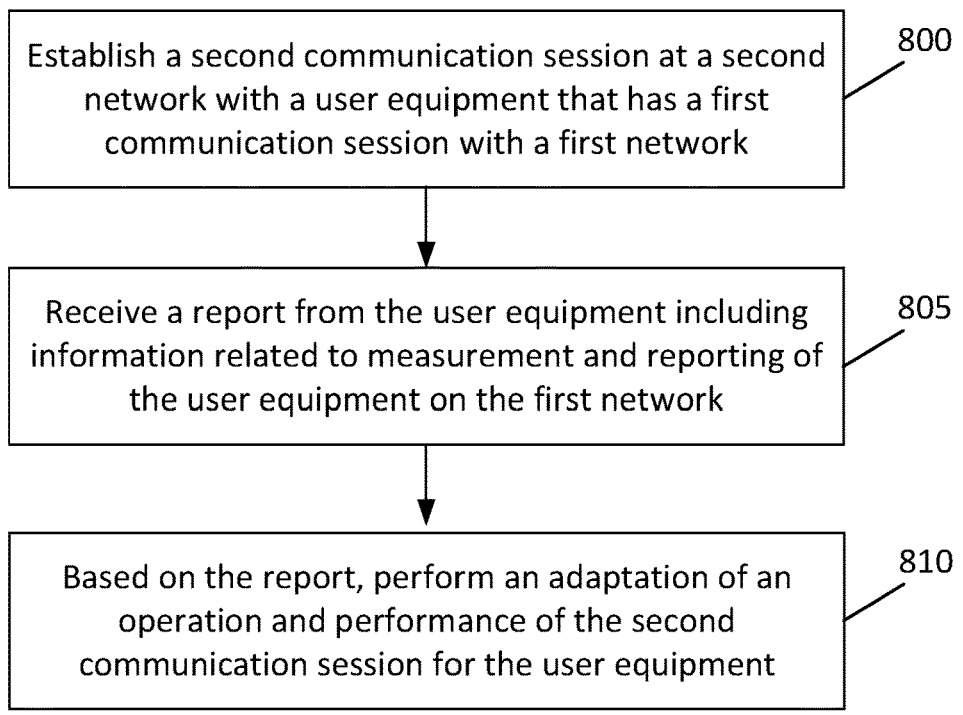
FIG. 8 illustrates a flow diagram of another method, according to certain example embodiments.

FIG. 8 illustrates a flow diagram of another method, according to certain example embodiments. In certain example embodiments, the flow diagram of FIG. 8 may be performed by a telecommunications network, network entity or network node in a 3GPP system, such as LTE or 5G-NR. For instance, in an example embodiment, the method of FIG. 8 may be performed by a communication network, for instance similar to apparatuses 10 or 20 illustrated in FIGS. 10(*a*) and 10(*b*).

According to certain example embodiments, the method of FIG. 8 may include, at 800, establishing a second communication session at a second network with a user equipment that currently has a first communication session with a first network. The method may also include, at 805, receiving a report from the user equipment including information related to measurement and reporting of the user equipment on the first network. The method may further include, at 810, based on the report, performing an adaptation of an operation and performance of the second communication session for the user equipment.

According to certain example embodiments, the method may also include sending an inquiry to the user equipment for exposing the report related to the measurement and reporting on the first network. According to other example embodiments, the method may further include receiving the report including exposable measurement configuration and reporting details of the first network. According to further example embodiments, the adaptation may include activating multi-connectivity or adding a new secondary node, or reconfiguring a packet data convergence protocol termination point for one or more radio bearers in the second network or adjusting the transmission format/resource in the second network. According to other example embodiments, the method may further include, based on the adaptation, reconfiguring a radio bearer service of the second communication session or selecting an alternative quality of service profile. According to other example embodiments, the method may further include, based on the adaptation, reconfiguring a radio bearer service of the second communication session or selecting an alternative QoS profile in the second communication session. According to further example embodiments, the method may also include, based on the adaptation, reporting to a network node of the second network on the first communication session concerning a determined outcome on the first communication session.

In certain example embodiments, the method may further include mapping the report to determine a future interruption occurrence of the first communication session with the first network, wherein the inquiry is based on a mapping of the report. In other example embodiments, the information related to the measurement and reporting may further relate to information on at least one of a trigger, timing procedure, or event of measurement at the first network. In some example embodiments, the inquiry or the report may include an indication of redundant protocol data unit session pair information.

Figure 9:
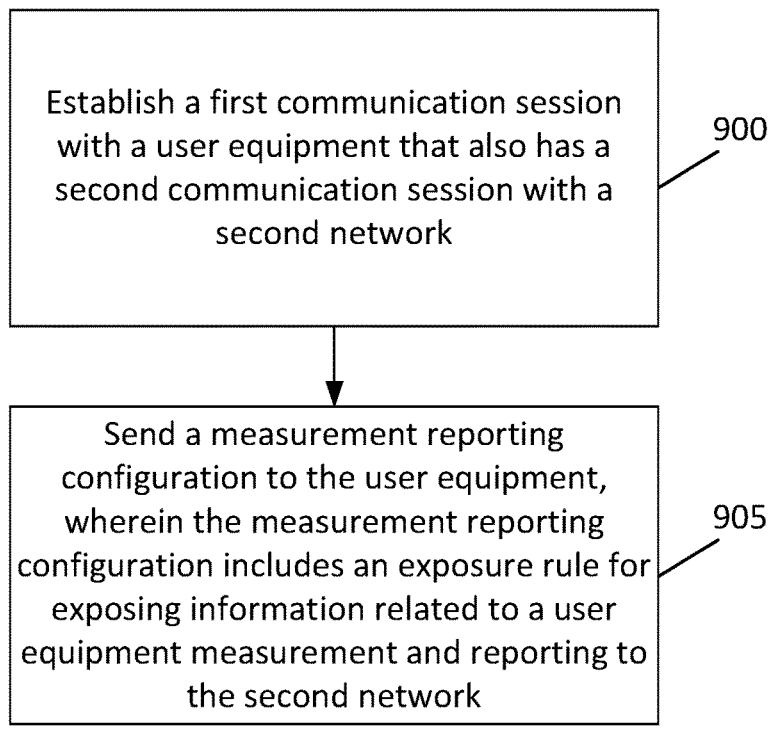
FIG. 9 illustrates a flow diagram of a further method, according to certain example embodiments.

FIG. 9 illustrates a flow diagram of a further method, according to certain example embodiments. In certain example embodiments, the flow diagram of FIG. 9 may be performed by a telecommunications network, network entity or network node in a 3GPP system, such as LTE or 5G-NR. For instance, in an example embodiment, the method of FIG. 9 may be performed by a communication network, for instance similar to apparatuses 10 or 20 illustrated in FIGS. 10(*a*) and 10(*b*).

According to certain example embodiments, the method of FIG. 9 may include, at 900, establishing a first communication session with a user equipment that also has a second communication session with a second network. The method may also include, at 905, sending a measurement reporting configuration to the user equipment, wherein the measurement reporting configuration may include an exposure rule for exposing information related to a user equipment measurement and reporting to the second network.

According to certain example embodiments, the method may further include receiving a first measurement report including an indication of allowed exposure information to the second network. According to other example embodiments, the method may include receiving a second measurement report including an inquiry made from the second network, and determining exposable details based on the inquiry. According to other example embodiments, the method may include sending a measurement reporting configuration to the user equipment. In certain example embodiments, the measurement reporting configuration may include an indication to indicate whether an inquired from the second network can be reported to the second network or not, the exposure rule on exposing additional measurement reports as inquired by the second network, or a measurement report that the first network allows the user equipment to expose to the second network.

Figure 10A:
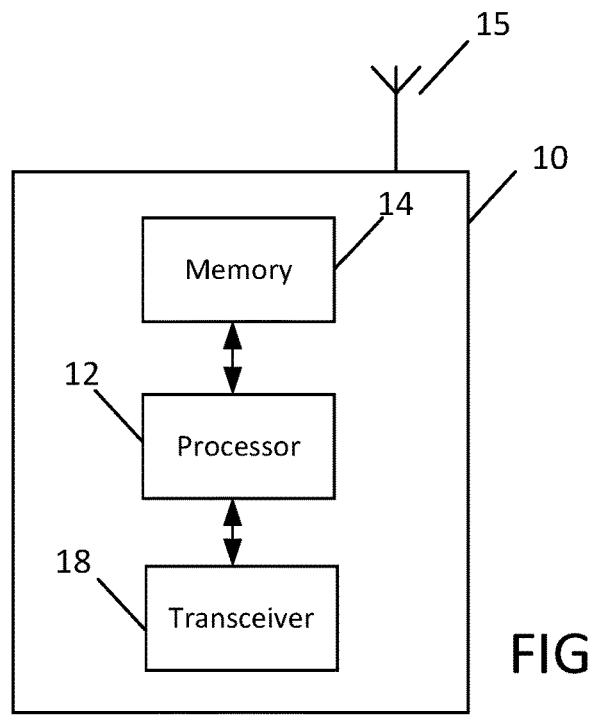
FIG. 10(*a*) illustrates an apparatus, according to certain example embodiments.

FIG. 10(a) illustrates an apparatus 10 according to certain example embodiments. In certain example embodiments, apparatus 10 may be a node or element in a communications network or associated with such a network, such as a UE, mobile equipment (ME), mobile station, mobile device, stationary device, IoT device, or other device. In other example embodiments, apparatus 10 may be a network element, node, host, server in a communication network or serving such a network. It should be noted that one of ordinary skill in the art would understand that apparatus 10 may include components or features not shown in FIG. 10(a).

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 10(a).

As illustrated in the example of FIG. 10(a), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 10(a), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-7.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-7.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

As discussed above, according to certain example embodiments, apparatus 10 may be a UE, for example. According to certain example embodiments, apparatus 10 may be controlled by memory 14 and processor 12 to perform the functions associated with example embodiments described herein. For instance, in certain example embodiments, apparatus 10 may be controlled by memory 14 and processor 12 to establish a first communication session with a first network and a second communication session with a second network. Apparatus 10 may further be controlled by memory 14 and processor 12 to receive configuration from the first network on exposing a report related to a measurement and reporting on the first network to the second network. Apparatus 10 may further be controlled by memory 14 and processor 12 to expose to the second network a report including information related to the measurement and reporting on the first network.

Figure 10B:
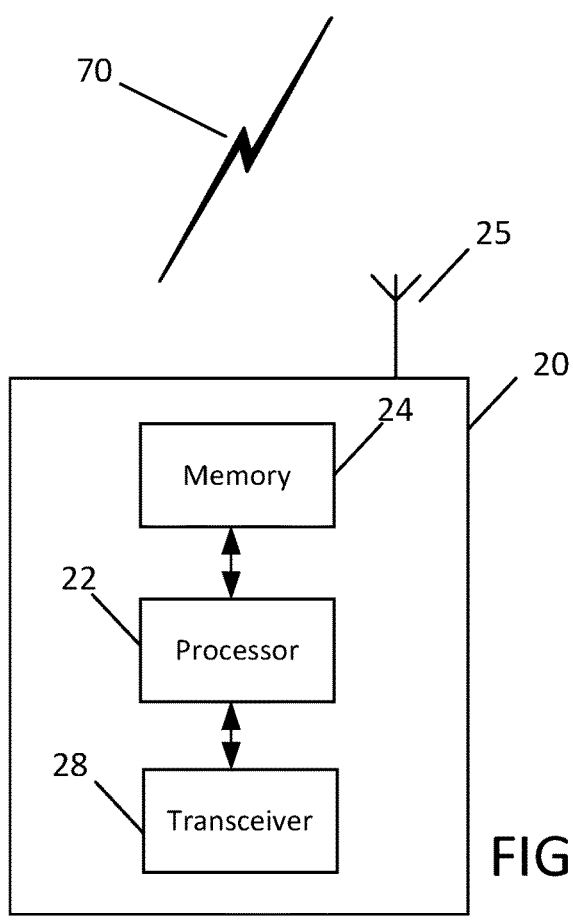

FIG. 10(b) illustrates an apparatus 20 according to certain example embodiments. In certain example embodiments, the apparatus 20 may be a node or element in a communications network or associated with such a network, such as a UE, mobile equipment (ME), mobile station, mobile device, stationary device, IoT device, or other device. In other example embodiments, apparatus 20 may be a communication network, base station, a Node B, an evolved Node B (eNB), 5G Node B or access point, next generation Node B (NG-NB or gNB), and/or WLAN access point, associated with a radio access network (RAN), such as an LTE network, 5G or NR. It should be noted that one of ordinary skill in the art would understand that apparatus 20 may include components or features not shown in FIG. 10(b).

As illustrated in the example of FIG. 10(b), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 10(b), multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-6, 8, and 9.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-6, 8, and 9.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a network element, node, host, or server in a communication network or serving such a network. For example, apparatus 20 may be a satellite, base station, a Node B, an evolved Node B (eNB), 5G Node B or access point, next generation Node B (NG-NB or gNB), and/or WLAN access point, associated with a radio access network (RAN), such as an LTE network, 5G or NR. According to certain embodiments, apparatus 20 may be controlled by memory 24 and processor 22 to perform the functions associated with any of the embodiments described herein.

As discussed above, according to certain example embodiments, apparatus 20 may be a communication network, for example. According to certain embodiments, apparatus 20 may be controlled by memory 14 and processor 12 to perform the functions associated with example embodiments described herein. For instance, in certain example embodiments, apparatus 20 may be controlled by memory 24 and processor 22 to establish a second communication session at a second network with a user equipment that currently has a first communication session with a first network. Apparatus 20 may also be controlled by memory 24 and processor 22 to receive a report from the user equipment including information related to measurement and reporting of the user equipment on the first network. Apparatus 20 may further be controlled by memory 24 and processor 22 to, based on the report, perform an adaptation of an operation and performance of the second communication session for the user equipment.

According to other example embodiments, apparatus 20 may be controlled by memory 24 and processor 22 to establish a first communication session with a user equipment that also has a second communication session with a second network. Apparatus 20 may also be controlled by memory 24 and processor 22 to send a measurement reporting configuration to the user equipment, wherein the measurement reporting configuration may include an exposure rule for exposing information related to a user equipment measurement and reporting to the second network.

Further example embodiments may provide means for performing any of the functions or procedures described herein. For example, certain example embodiments may be directed to an apparatus that includes means for establishing a first communication session with a first network and a second communication session with a second network. The apparatus may also include means for receiving configuration from the first network on exposing a report related to a measurement and reporting on the first network to the second network. The apparatus may further include means for exposing to the second network a report including information related to the measurement and reporting on the first network.

Other example embodiments may be directed to a further apparatus that includes means for establishing a second communication session at a second network with a user equipment that currently has a first communication session with a first network. The apparatus may also include means for receiving a report from the user equipment including information related to measurement and reporting of the user equipment on the first network. The apparatus may further include means for, based on the report, performing an adaptation of an operation and performance of the second communication session for the user equipment.

Further example embodiments may be directed to another apparatus that includes means for establishing a first communication session with a user equipment that also has a second communication session with a second network. The apparatus may also include means for sending a measurement reporting configuration to the user equipment, wherein the measurement reporting configuration may include an exposure rule for exposing information related to a user equipment measurement and reporting to the second network.

Certain example embodiments described herein provide several technical improvements, enhancements, and/or advantages. In some example embodiments, it may be possible to enable and facilitate possible coordination and adaptation between networks (e.g., NW1 and NW2) for serving the UE with RPS. In other example embodiments, it may also be possible to allow for information essential for enabling and facilitating necessary network coordination and adaptation between different networks (e.g., NW1 and NW2) in serving the UE with RPS to be made available in a timely, controllable, and efficient manner.

A computer program product may include one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

5GS 5G System
CN Core Network
DC Dual Connectivity
eNB Enhanced Node B
gNB 5G or Next Generation NodeB
HO Handover
LTE Long Term Evolution
MC Multi-Connectivity
MN Master Node
NAS Non-Access Stratum
NR New Radio
NW Network
PDCP Packet Data Convergence Protocol
PDU Protocol Data Unit
PS PDU Session
RAN Radio Access Network
RB Radio Bearer
RPS Redundant PDU Session
SMF Session Management Function
SN Secondary Node
UE User Equipment

We claim:

1. An apparatus, comprising:
at least one processor; and
at least one memory comprising computer program code, the at least one memory and the computer program code being configured, with the at least one processor, to cause the apparatus at least to:
establish a first communication session with a first network and a second communication session with a second network, wherein the first communication session and the second communication session are provided using multi-connectivity, and wherein a first network node of the first network, and a second network node of the second network are represented as a master and secondary node of a same network;
receive, from the second network, an inquiry for exposing a report related to a measurement and reporting on the first network, wherein the inquiry comprises an indication of redundant protocol data unit session pair information, and the report related to the measurement and reporting on the first network comprises information related to the measurement and reporting on the first network and inquired by the second network, wherein the information related to the measurement and reporting on the first network further relates to information on:
a trigger,
a timing procedure, and
an event of measurement at the first network; and
forward the inquiry to the first network to obtain exposable configuration details of the first network;
determine whether a service interruption to the first communication session is caused by a master node change or a secondary node change in the first network; and
determine whether the measurement and reporting on the first network is to be exposed to the second network;
receive, from the first network, configuration on exposing the report related to a measurement and reporting on the first network to the second network, wherein the configuration on exposing the report is related to the inquiry from the second network for exposing the report related to the measurement and reporting on the first network, and wherein the configuration from the first network comprises an exposure rule, wherein the exposure rule specifies:
events,
triggers,
conditions,
measurement report types,
contents of a measurement report exposable to the second network, and
dual connectivity related rules;
indicate, according to the exposure rule, to the first network that a user equipment is exposing the information related to the measurement and reporting to the second network; and
expose, to the second network, the report comprising information related to the measurement and reporting on the first network.

* * * * *